No. 619,846. Patented Feb. 21, 1899.
H. J. SHAWCROSS.
VEHICLE WHEEL.
(Application filed Apr. 12, 1898.)
(No Model.)
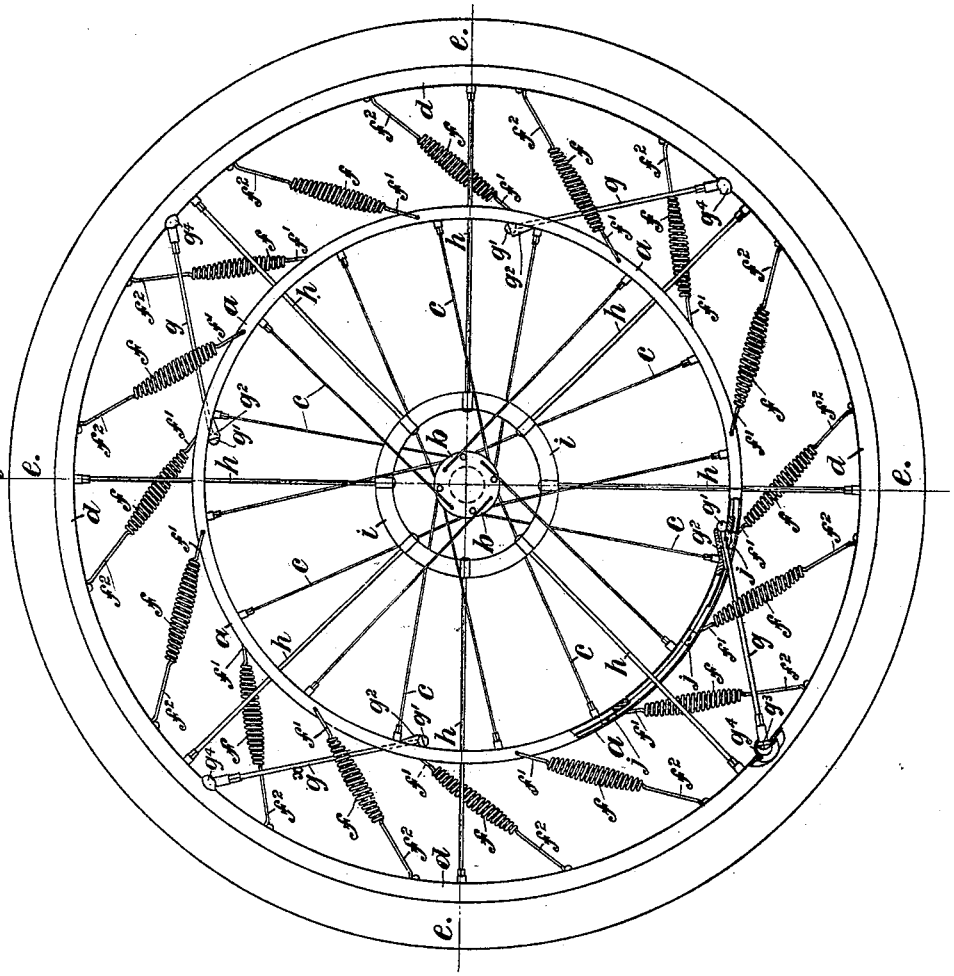
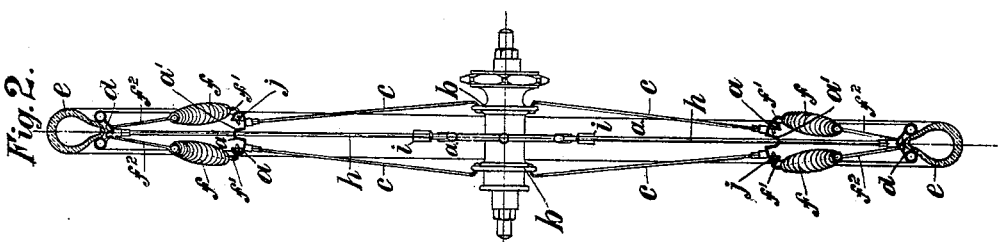

UNITED STATES PATENT OFFICE.

HENRY JOSEPH SHAWCROSS, OF LIVERPOOL, ENGLAND.

VEHICLE-WHEEL.

SPECIFICATION forming part of Letters Patent No. 619,846, dated February 21, 1899.

Application filed April 12, 1898. Serial No. 677,358. (No model.)

*To all whom it may concern:*

Be it known that I, HENRY JOSEPH SHAWCROSS, residing at Liverpool, Lancaster county, England, have invented certain new and useful Improvements in Velocipede and Vehicle Wheels, of which the following is a specification.

This invention has reference to the wheels of velocipedes and other vehicles, but more particularly to wheels of velocipedes, autocycles, or cars and the like, in which it is particularly desirable that practically all vibration and jar in the frame or body should be obviated; and the object of the invention is mainly to provide a wheel for velocipedes or such vehicles by which these effects or results shall be afforded and in which all sudden vertical movement of it due to uneven roads, obstructions, and the like received by the rim or tire shall not be transmitted to the axle and body of the vehicle, but shall be taken up or absorbed in the wheel between the tire or rim and the axle and so render the movement of the bicycle or vehicle, as the case may be, even when running over uneven roads, smooth and steady and practically without jar, provision being at the same time made for lateral stiffness, which shall prevent all relative side motion of the component parts of the wheel.

The invention will be described with reference to the accompanying drawings, in which—

Figure 1 is a side elevation, and Fig. 2 is a cross-section, of a wheel under the invention.

Referring to the drawings, the wheel shown comprises a central portion consisting of a rim $a$ and hub $b$, rigidly connected together by the spokes $c$, arranged in any known suitable way and forming a rigid wheel-frame connected to the flanges of the hub $b$, of which it practically forms an extension, and an outer rim or rim proper, $d$, with a pneumatic, rubber, or other suitable tire $e$ upon it, which runs upon the road, this rim $d$ being connected with the inner wheel portion by approximately tangentially-arranged longitudinally-elastic ties $f$, (which in the case shown consist of spiral springs,) fastened to the rim $a$ and to the rim $d$, and by rigid or substantially rigid ties $e$, also approximately tangentially arranged, but in an opposite direction to the elastic ties $f$. Thus the connection between the inner and outer rims $a$ and $d$ is both elastic and rigid—that is, it is elastic in one respect and direction and rigid or substantially rigid in the other respect or direction as regards movement in the plane of the wheel. With regard to the term "rigid" used in this connection it is to be understood in a relative sense—that is, it is rigid or non-elastic as compared with the ties $f$, but not necessarily non-elastic; but in any case, even if it be provided with more or less elasticity, this elasticity will be substantially less than that of the springs $f$ and will not be exercised under normal conditions. In addition to this connection of the outer and inner rim there is provided a lateral support consisting of radial rods $h$, connected to the rim $d$, and an internal hub-ring $i$ around the hub $b$ and disposed in the plane of the wheel. The rods $h$ pass through the center of the rim $a$ through slots therein, these slots being in width equal to the diameter of the rods $h$ and extending circumferentially some distance on either side of the normal position of the rod, so that the outer and inner rims may have vertical play or revolving movement about each other. By this lateral support the rims $b$ and $a$ must partake of the same lateral or twisting movements, and neither of them can move laterally out of the plane of the wheel. In order to provide a large rubbing-surface between the rods $h$ and the inner rim $a$, this rim is provided at the center with a recessed portion $a'$, the sides of which are vertical and against which the rods $h$ will bear. The rods $h$ and ring $i$ have also for their object and effect to strengthen the rim $d$ and keep it truly circular.

The rigid ties $g$ (shown in the drawings) are supported in the rims by ball-and-socket joints, they being provided at their inner ends with a ball-head $g'$, fitting into or resting in a socket $g^2$, fixed in the rim $a$ and capable in one direction of penetrating or sliding into the wheel $a$, but forming a pinhead support in the opposite direction, and at their outer ends with a screw-nipple $g^3$, having a semispherical head fitting and resting in the socket $g^4$, let in and supported by the rim $d$. By the screwed socket-nipples $g^3$—that is, by screwing them up more or less or unscrewing them—the tension on the springs $f$ can be varied and made greater or less, according to the weight they will have to bear or requirements, and by means of these elastic and non-elastic ties $f$ and $g$ movement of the two rims in the plane of the wheel is provided for in the operation of the machine.

The function of the rigid or substantially rigid ties $g$ is to serve as supports to the central portion of the wheel—i. e., to what may be called the "rising" side of the wheel when in motion, which in the drawings is the left-hand side, while the elastic ties $f$ run in an opposite direction and give an elastic support to the falling—that is, the right-hand—side. On this side the ties $g$ do not take the weight of the machine and rider, practically the whole of the weight being taken by the tie $g$, which for the time being is at the upper part of the rising half of the wheel and in the drawings is marked $g^x$, and by the springs. Thus the inner wheel-frame $a$ carries the whole of the weight of the machine and rider transmitted through the hub $b$, and when in motion this wheel is continually rolling forward into a bed of springs, which are all in tension and all in work.

Regarding the tension of the springs $f$, this may be varied according to the weight of the rider—as, for instance, it may be so adjusted that when the rider is upon the machine the springs will just support the weight without materially stretching—so that normally the inner frame will be nearly concentric with the outer rim $d$—i. e., the elastic ties will be in tension within the wheel to such a degree that when the wheel receives its due load the inner part of the wheel and vehicle will be just supported without substantial stretching of the ties. The effect of this construction is that when running and a sudden vertical movement is given to the outer rim $d$ by an unevenness or obstacle in the road its concentric position with regard to the central rim or part is disturbed, the rim $d$ being raised and the lower part moved nearer to the axis of the wheel and the upper part farther therefrom, and as this movement must take place about the back half of the rim $d$—that is, about the supporting-rod $g$—the rim will move upward practically about this point, thus bringing into further action and tension the springs. The rim or tire thus becomes a circular lever fulcrumed by one or more of the rigid ties $g^x$ and acts upon all the weights or resistances—that is, the spring-ties $f$—all around the wheel.

As regards the special construction and arrangement of springs and parts shown in the drawings it will be seen that the inner rim $a$ has inturned or channeled edges, and the alternate springs around the wheel are fastened at their inner ends to the opposite sides of this rim, which is made broad on purpose, while the outer end of the springs is secured to the center of the rim $d$ or crossed over to give as great an angle to the springs as possible to the plane of the wheel. By this arrangement of springs the outer rim $d$ is given additional lateral support—i. e., it is braced from either side by these springs.

At the points where the springs $f$ are joined to the sides of the rim $a$ the rims are provided internally with solid screwed nuts $j$ as bearings and supports.

The spokes $c$ and $h$ are secured to the hub $b$ or ring $i$ of the rims $a$ or $d$ in any of the usual ways and tension put upon them to the required degree.

In the wheel shown in the drawings the springs are adapted to operate under tension; but according to a modification these springs may be arranged to operate in compression.

What is claimed in respect of the herein-described invention is—

1. A velocipede or like wheel comprising an outer rim, and an inner rim and wheel-frame adapted to support the vehicle-frame, movable in relation to each other, in the plane of the wheel, and duplex sets of connecting-ties connecting the outer and inner rims, and by which the inner wheel-frame is supported, one set of ties being adapted to hold the inner wheel-frame in one direction at one position, a normally constant position, relatively to the outer rim, and the other set having elasticity and adapted to allow of relative movement of the inner and outer rims, at another part of the wheel.

2. A velocipede or like wheel comprising an outer rim, and an inner rim or wheel-frame adapted to support a vehicle-frame, movable in relation to each other in the plane of the wheel, a set of connecting-springs $f$, connecting the outer and inner rims, and disposed diagonally to the radii of the wheel, and substantially rigid connecting tie-rods $g$, disposed at similar inclinations, but opposite in direction to those of the springs, said rods being adapted to support the inner rim from the outer rim, and hold it at one side of the wheel, and the springs being adapted to allow movement on the other side of the wheel; substantially as set forth.

3. A velocipede or like wheel, comprising an outer rim, and an inner rim and wheel-frame adapted to support the vehicle-frame, movable in relation to each other in the plane of the wheel, and duplex sets of connecting-ties connecting the outer and inner rims, and by which the inner wheel is supported, one set of ties being adapted to hold the inner wheel-frame at one point in a constant position relatively to the outer rim, and the other set having elasticity, and adapted to allow of relative movement of the inner and outer rims at another part of the wheel, and radial rods $h$ connected with the outer rim, and passing through and controlled laterally by said rim, by which lateral movement of the outer and inner rims, out of the plane of the wheel is prevented; substantially as set forth.

4. In a velocipede or like wheels having outer and inner parts, capable of movement in relation to each other in the plane of the wheel, the combination of inclined spring connections $f$, and oppositely-disposed inclined rigid connections $g$; substantially as set forth.

5. In velocipede or like wheels having outer and inner parts capable of movement in relation to each other in the plane of the wheel, the combination of inclined spring connections $f$, and oppositely-disposed inclined rigid connecting-ties $g$, the said ties $g$ being adjustable lengthwise, by which the tension on the springs $f$ can be varied, for the purposes described; substantially as set forth.

6. A velocipede or like wheel, comprising an outer rim $d$; inner wheel-frame, comprising rim $a$, hub $b$, and spokes $c$, diagonal connecting-springs $f$, diagonally-rigid connecting and supporting rods $g$ oppositely inclined to $f$, and laterally-supporting rods $h$, and connecting-ring $i$; substantially as set forth.

In witness whereof I have hereunto set my hand in presence of two witnesses.

HENRY JOSEPH SHAWCROSS.

Witnesses:
 JOHN H. WALKER,
 JNO. W. BROWN.